United States Patent
Gopalarathnam et al.

(10) Patent No.: US 9,455,920 B2
(45) Date of Patent: Sep. 27, 2016

(54) AVOIDING TRAFFIC LOSS DUE TO ROUTE FAILURES

(71) Applicant: DELL PRODUCTS L.P., Round Rock, TX (US)

(72) Inventors: Sudharsan Dhamal Gopalarathnam, Chennai (IN); Avinash Natarajan, Chennai (IN); Ramasubramani Mahadevan, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 218 days.

(21) Appl. No.: 14/456,129

(22) Filed: Aug. 11, 2014

(65) Prior Publication Data

US 2016/0043954 A1 Feb. 11, 2016

(51) Int. Cl.
*H04L 1/00* (2006.01)
*H04L 12/801* (2013.01)
*H04L 12/741* (2013.01)
*H04L 12/721* (2013.01)

(52) U.S. Cl.
CPC .............. *H04L 47/17* (2013.01); *H04L 45/72* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2002/0138628 A1* | 9/2002 | Tingley | H04L 29/12009 709/227 |
| 2006/0140190 A1* | 6/2006 | Lee | H04L 45/04 370/395.3 |
| 2010/0271933 A1* | 10/2010 | Li | H04L 45/00 370/219 |

* cited by examiner

*Primary Examiner* — Kevin C Harper
(74) *Attorney, Agent, or Firm* — North Weber & Baugh LLP (57) ABSTRACT

Embodiments of the present invention include systems and methods for preventing traffic loss of data directed to a destination in a network. A router in the network attempts to install a route prefix of a destination or an ARP entry in the router. If the attempt fails, the router determines whether the routing device originates the uninstalled route prefix or a set of route prefixes pointing the uninstalled ARP entry as next hop in an internet protocol (IP) reachability. If the determination is negative, the router sends a message to a neighboring router to add the router to the exclude route list of the neighboring router. When the neighboring router determines an optimal route involving the uninstalled route prefix or the set of route prefixes pointing the uninstalled ARP entry, it looks up the exclude route list so that the router is not included when determining the optimal route.

20 Claims, 6 Drawing Sheets

AVOIDING TRAFFIC LOSS DUE TO ROUTE FAILURES

A. TECHNICAL FIELD

The present invention relates to mitigation of impact due to a failure in a network device during network communication, more particularly, to systems and methods for avoiding traffic loss due to a failure in a routing device.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
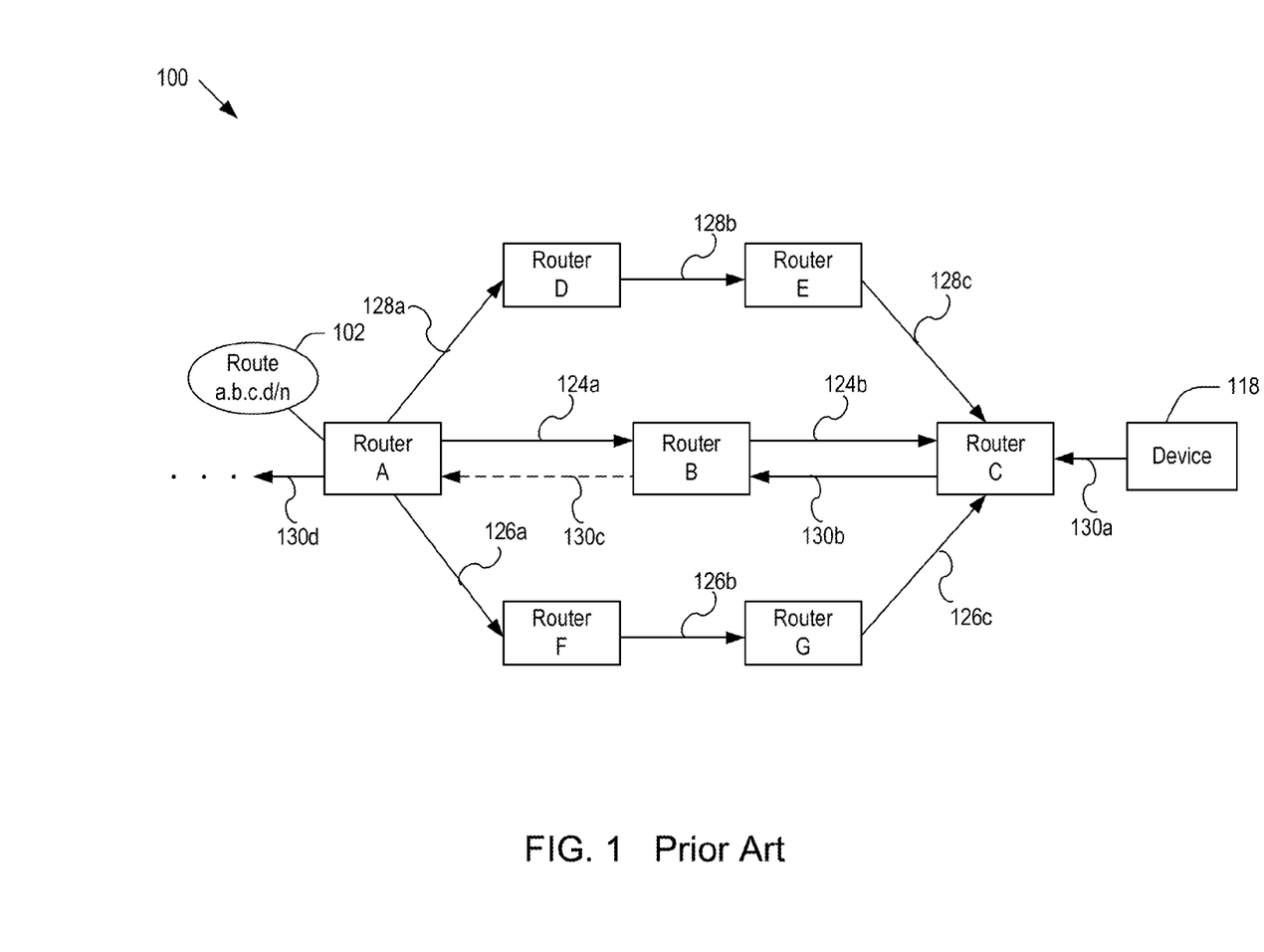
FIG. 1 shows a schematic diagram of a conventional network.

In general, the conventional network systems may lose data packets due to various failures, such as hash collision, CAM full, and hardware failure, in routers. FIG. 1 shows a schematic diagram of a conventional network 100. As depicted, one or more components on the left hand side of the router A communicates data to a device 118 via a network having seven routers, router A, router B, router C, router D, router E, router F, and router G. For the purpose of illustration, it is assumed that the router A gets information of route prefix a.b.c.d/n 102 that is located on the left hand side of the router A. Also, it is assumed that data packet flows from the device 118 to a component on the left hand side of the router A, as indicated by an arrow 130d.

Typically, each router gets reachability information (or, equivalently, control packet information) from a neighboring router(s). For instance, router D, router B and router F get reachability information from router A as indicated by arrows 128a, 124a, and 126a, respectively, where the reachability information includes the route prefix a.b.c.d/n 102. More specifically, the router A uses a routing protocol to advertise the reachability information, i.e., it sends information to another router, indicating that a specific network is reachable, and what the next hop or IP address is to use to get to the final destination. Likewise, router E, router G and router C get reachability information from router D, router B, and router F, as indicated by arrows 128b, 124b, and 126b, respectively. Router C may also get reachability information from router B and router G, as indicated by arrows 128c and 126c, respectively. In general, each of the seven routers in FIG. 1 uses a routing protocol that shares the reachability information among immediate neighbors first and then, the reachability information is disseminated throughout the entire network 100.

When the routers gain knowledge of the topology of the network 100, a routing algorithm determines a specific choice of route. For instance, assuming that each path between two adjacent routers has the same metrics, the shortest path first (SPF) calculation performed by the routing algorithm will show that the shortest path to send a data packet from the device 118 to the route A would be "device 118->router C->router B->router A" as indicated by arrows 130a, 130b, and 130c.

Typically, each router has a routing table that lists one or more routes to each particular network destination. When a router, say the router B, has an installation failure, such as hash collision and content-addressable-memory (CAM) full, the information of the route prefix a.b.c.d/n 102 cannot be installed in the routing table of the router B. CAM full occurs when a routing table does not have enough memory space to store additional route entry therein, while hash collision may occur even when the routing table has enough memory space.

Since the router C is not aware of the failure in the router B, the router C will send the router B data packets received from the device 118 towards a.b.c.d/n, based on the SPF calculation. However, the router B does not have a.b.c.d/n in its route table due to hardware failure and cannot send the data packets to the route prefix 102 and, subsequently, the data packets will be lost as indicated by the arrow 130C.

Currently, there is no correction mechanism for a failure, such as route installation failure, in a router during network communication. Accordingly, there is a need for systems and methods for avoiding traffic loss due to a failure in a router.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/routers/switches within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 2:
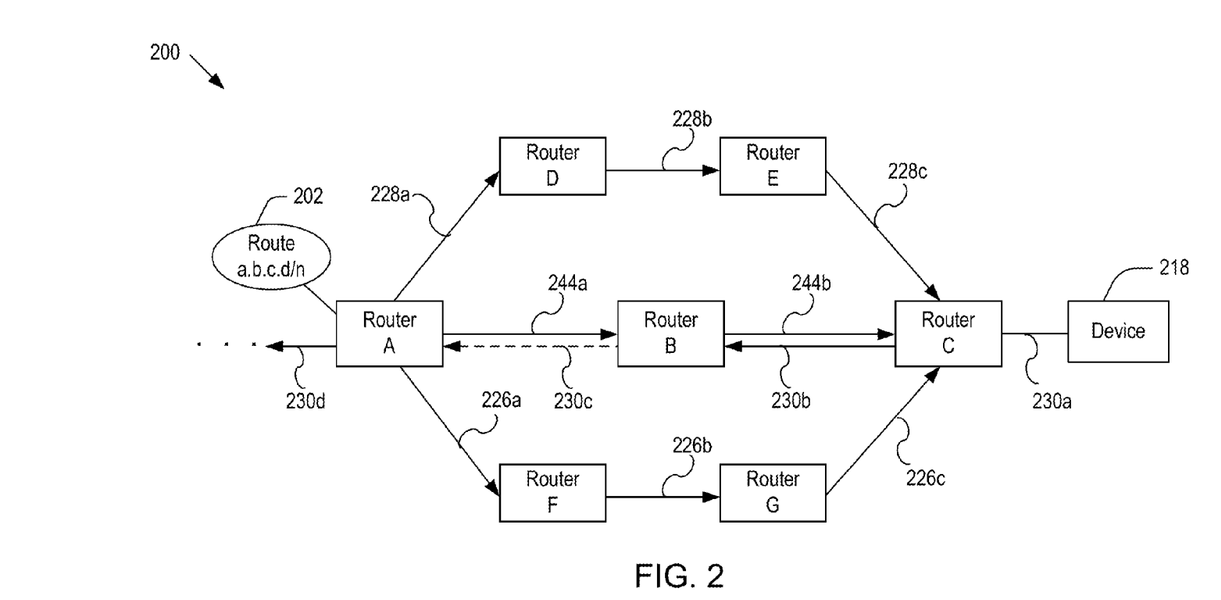
FIG. 2 shows a schematic diagram of a network according to embodiments of the present invention.

FIG. 2 shows a schematic diagram of a network 200 according to embodiments of the present invention. As depicted, one or more components on the left hand side of the router A communicates data to a device 218 via a network having seven routers, router A, router B, router C, router D, router E, router F, and router G. Even though only seven routers are shows in FIG. 2, it should be apparent to those of ordinary skill in the art that other suitable number of routers can be used for communication in the network 200. For the purpose of illustration, it is assumed that the router A gets the information of route prefix a.b.c.d/n 202. Also, for the purpose of illustration, it is assumed that the reachability (or, control packet) information flows from the router A to the device 218 and data packet flows from the device 218 to the router A.

Each router may advertise control packet information (or, reachability information) to neighboring routers using a routing protocol. For instance, router D, router, and router F get reachability information from router A as indicated by arrows 228a, 224a, and 226a, respectively. The control packet information may include data indicating that a specific network is reachable, and what the next hop or IP address is to use to get to the final destination. Likewise, router E, router G, and router C get control packet information from router D, router B, and router F, as indicated by arrows 228b, 224b, and 226b, respectively. Router C may also get control packet information from router B and router G, as indicated by arrows 228c and 226c, respectively. The control packet information is eventually disseminated throughout the entire network 200 so that the seven routers gain knowledge of the overall network topology.

When a router gains knowledge of the topology of the network 200, a routing algorithm of the router determines a specific choice of route for data transmission. For instance, assuming that each path between two adjacent routers has the same metrics and none of the router have a failure, the shortest path first (SPF) calculation performed by the routing algorithm of the router C will show that the shortest/optimal path to send data packets from the device 218 to the route A would be "device 218->router C->router B->router A" as indicated by arrows 230a, 230b, and 230c. Thus, when the router C receives data packet from the device 218, the router C will forward the data packet to the router B.

A router can have various types of failures, such as hardware failure, hash collision, and CAM full, etc. These failures can occur in routing table or otherwise called longest prefix match table and also in installing host entry or address-resolution-protocol (ARP) entry. Hereinafter, for the purpose of illustration, it is assumed that the router B has an installation failure due to hash collision. However, for the other types of failures, the routers in the network 200 may take the same approach as described below in conjunction with FIGS. 3-5 to avoid traffic loss due to the failures.

Figure 3:
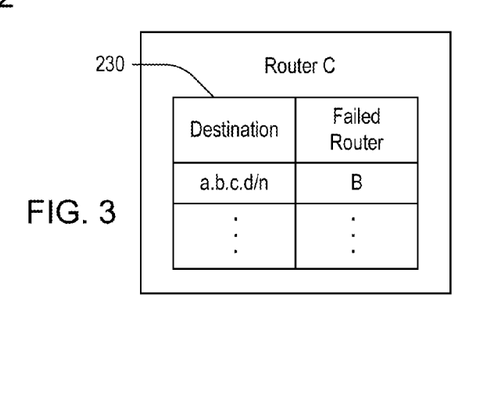
FIG. 3 shows a schematic diagram of an exclude route list according to embodiments of the present invention.

When the router B has a hash collision, the information of the route prefix a.b.c.d/n 202 cannot be installed in the routing table of the router B. Whenever the route entry is not installed in the routing table, the router B sends its identification, such as IP address, and the information of the route prefix a.b.c.d/n 202 to the neighboring routers (in this case, routers C, D, E, F, and G) so that the neighboring routers are informed of the failure. In case of installation failure of ARP or host entry, the set of routes that point the ARP as next hop are informed to the neighboring routers. Then, each of the neighboring routers updates its exclude route list with the set of routes that router B informed and excludes the router B when the neighbor routers perform their SPF calculations for those particular set of routes FIG. 3 shows a schematic diagram of an exclude route list 230 that the router C maintains according to embodiments of the present invention. As depicted, each entry in the exclude route list 230 includes the destination route prefix and IP address of the failed router. For instance, the router C would exclude the router B when the router C performs its SPF calculation to determine optimal routes for transmitting data packets to the destination route prefix a.b.c.d/n 202. Hereinafter, the term destination refers to any component(s) that a data packet transmitted by the router C passes through or that is the final recipient of the data packet. In embodiments, the destination may be a device in the network or a set of routes/paths having a common IP prefix in the network. In embodiments, the destination can be an end node or an intermediate router for data transmission.

The exclude route list 230 may be carried in a vendor specific format. For instance, the exclude route list 230 may be packed into a time-length-value (TLV) element in case of ISIS® routing protocol and Opaque Link-State Advertisement (LSA) in case of Open-Shortest-Path-First (OSPF)® routing protocol. It should be noted that other formats may be used.

Figure 4:
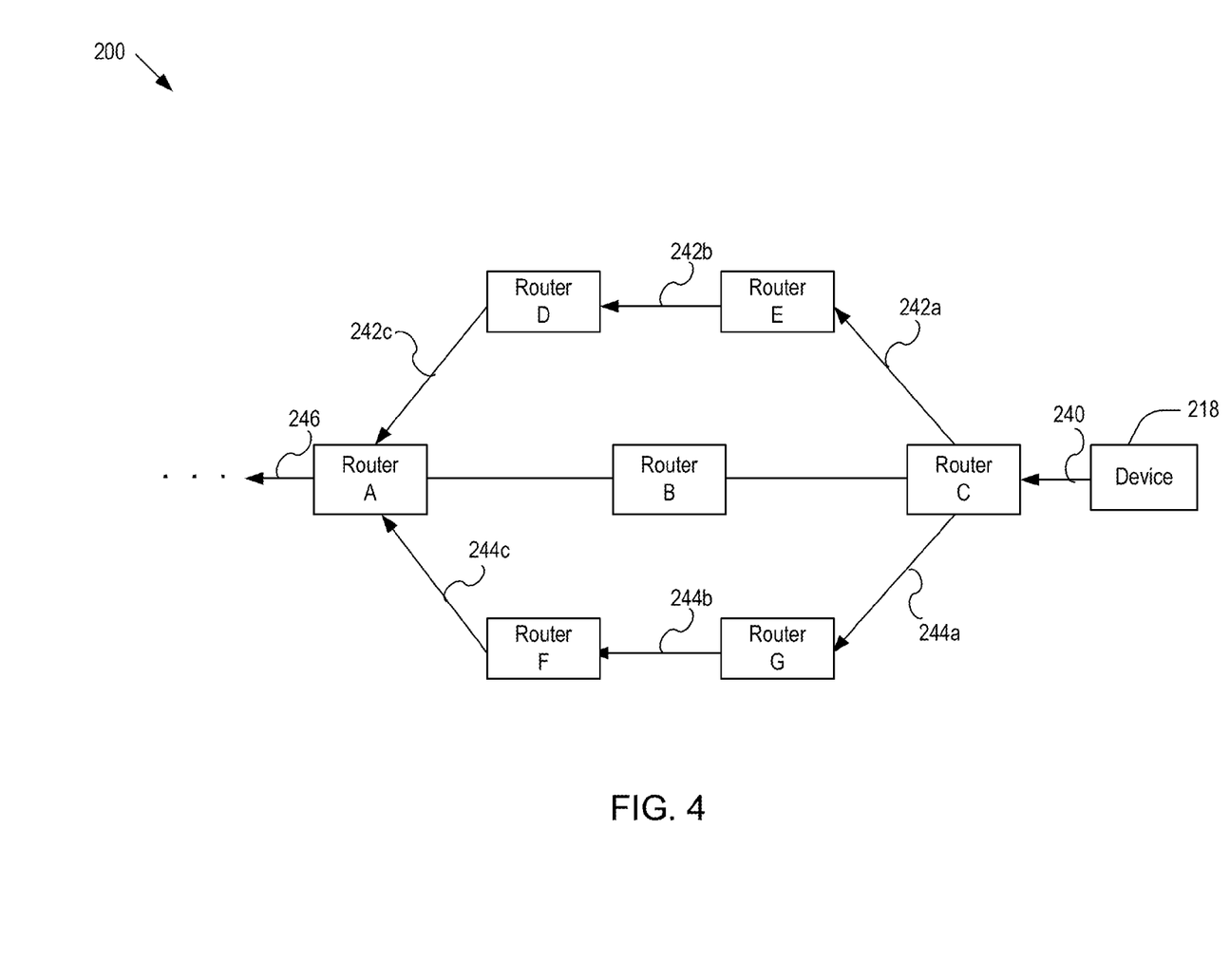
FIG. 4 shows data flow in the network of FIG. 3 according to embodiments of the present invention.

FIG. 4 shows data flow in the network 200 according to embodiments of the present invention. When the router C performs the SPF calculation, it looks up the exclude route list table 230 and excludes the router B in determining the optimal route to the route prefix a.b.c.d/n 202 so that data packets will not be sent through the router B. Assuming that each path between two adjacent routers has the same metrics, data packets from the router C to the route prefix a.b.c.d/n 202 will follow either the first sequence of arrows 240->242a->242b->242c or the second sequence of arrows 240->244a->244b->244c, even though these two paths are not the shortest path from the router C to the router A in terms of metrics. In embodiments, for other types of router failures, SPF calculation performed by a router may not necessarily yield a shortest path to avoid traffic loss for the similar reasons as discussed in conjunction with FIGS. 3 and 4.

Figure 5:
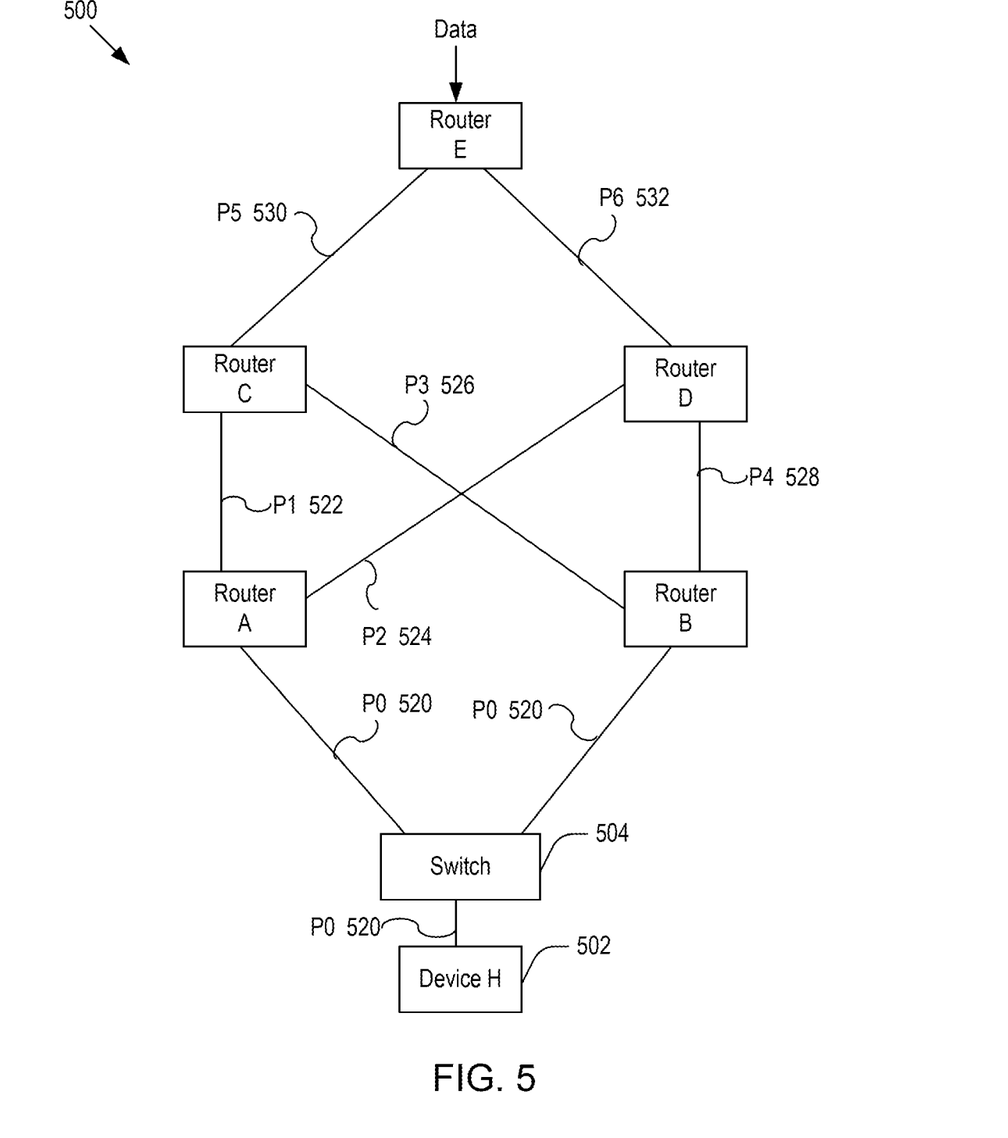
FIG. 5 shows a schematic diagram of an exemplary network according to embodiments of the present invention

FIG. 5 shows a schematic diagram 500 of an exemplary network according to embodiments of the present invention. In the network 500, each of the seven IP prefixes (or, equivalently network prefixes), P0 520, P1 522, P2 524, P3 526, P4 528, P5 530 and P6 532, represents one or more paths having a common IP prefix. For instance, P0 520 refers to three paths under the same IP prefix, P0. As such, hereinafter, the term IP prefix and path(s) are used interchangeably. For the purpose of illustration, it is assumed that the data packets flow from router E to device H 502 via a switch 504, where the device H 502 can be any suitable entity, such as computer or server. It is also assumed that the metrics of a path between two adjacent routers has the same value, say 10.

In the network 500, the router A and router B advertise the IP reachability, i.e., they send the control packet information to routers C and D, according to TLV format in case of ISIS® routing protocol. Likewise, the router C and router D send the control packet information to router E so that all of the routers in the network 500 know the topology of the network 500. The steps for SPF calculations to prevent data loss due to two exemplary failures are discussed below.

1. Failure in Installing IP Prefix, P0, at Router A

As depicted in FIG. 5, the router A originates P0, where the term "originate" means that the router A is directly connected to one of the routes under the common IP prefix, P0. As such, if P0 520 is not installed in the routing table of the router A due to a failure, the router A does not simply include P 520 in its IP reachability TLV that is advertised to neighboring routers. Since the IP reachability to the device H 502 is not advertised, the other routers would not consider the router A in their SPF calculations when the destination of a data packet is the device H 502. Also, the exclude route lists of the other routers do not need to be updated.

2. Failure in Installing IP Prefix, P0, at Router C

If P0 520 is not installed in the routing table of the router C due to a failure, the router C enters data [P0, router C] into its exclude route list TLV, indicating that installation of P0 failed at the router C. When the router E runs its SPF calculation, it may take the following steps: (1) The router E adds the connected routes P5 530 and P6 532 directly to its path entry list (PENT). (2) The router E processes the link state packet-switched-data (LSP) of its neighbors. When it processes C's LSP, P1 522 and P3 526 are added to temporary entry (TENT) with a cost of 10. The router E also processes its exclude route list TLV that includes the entry [P0, router C] and caches it for future processing, to thereby ensure that P0 is not written into TENT while the SPF later expands on the router C's neighbors. (3) The router E then processes the LSP of the router D. During this process, P2 524 and P4 528 are added to TENT with a cost of 10. (4) The router E runs the SPF calculation to pick a neighbor that has the least cost value. In this case, both the router C and router D have the same cost of 10, and thus, the SPF calculation may pick either the router C or router D.

(5) Assuming the router C is chosen at step (4), the SPF calculation expands on the router C's neighbors (here, routers A and B). While processing router A's LSP, the router E would find P0 in its IP reachability TLV. However, from the cached exclude route list information, the router E finds the entry [P0, route C] and decides that P0 should not be written to TENT. Thus, P0 would not be written to TENT while processing LSP of the router A. Similarly, P0 would not be written to TENT while processing LSP of the router B for the same reason. Upon completion of processing LSP of the routers A and B, the SPF calculation proceeds to the router D since the routers A and B are leaf routers.

(6) When the router D is chosen at step (4), the SPF calculation expands on the router D's neighbors (here, routers A and B). Normally, all of router A's prefixes, including P0, would have already in TENT, and the expansion on the router D would have yielded equal-cost-multipath (ECMP) through the routers C and D to reach P0. Since P0 was not added to TENT in step (5) due to the presence of P0 in the exclude route list via the router C, P0 is added to the TENT for the first time. For the same reason, P0 would be seen via the router B, too. However, from the router E's point of view, both entries are added via the router D, and thus, these paths to P0 will be merged so that the data packets sent by router E would reach P0 520 only through the router D. In the SPF calculation expanded on the router D, the exclude route list of the router C does not have any effect since the router D are already considered to be a proper intermediate router and its IP address was entered into PENT.

Upon completion of the steps (1)-(6), the router E would conclude that it can send data packets via one of the two paths since the two paths have the same metrics: router E->router D->router A->switch 504->device H 402, and router E->router D->router B->switch 504->device H 402. In the conventional systems, the router E transmits data packets through router E->router C->router A->switch 504 or router E->router C->router B->switch 504. But, due to the installation failure at the router C, the data packets sent to the router C would not be transmitted to the router A or router B, resulting in data traffic loss. In contrast, in embodiments, the data packets transmitted by the router E would reach the device H 502 without any loss in the network 500.

It is noted that the optimal route can be determined based on various types of the costs or metrics. In embodiments, a metric is based on hopcount, where one hop is a path between two adjacent routers. For instance, the hopcount of the optimal route from the router E to the device H 502 in FIG. 5 is four. In other embodiments, a metric is based on summation of metric costs along the route. For instance, the metric of the optimal route from the router E to the device H 502 in FIG. 5 is 40, assuming that the cost for each hop is 10.

Figure 6:
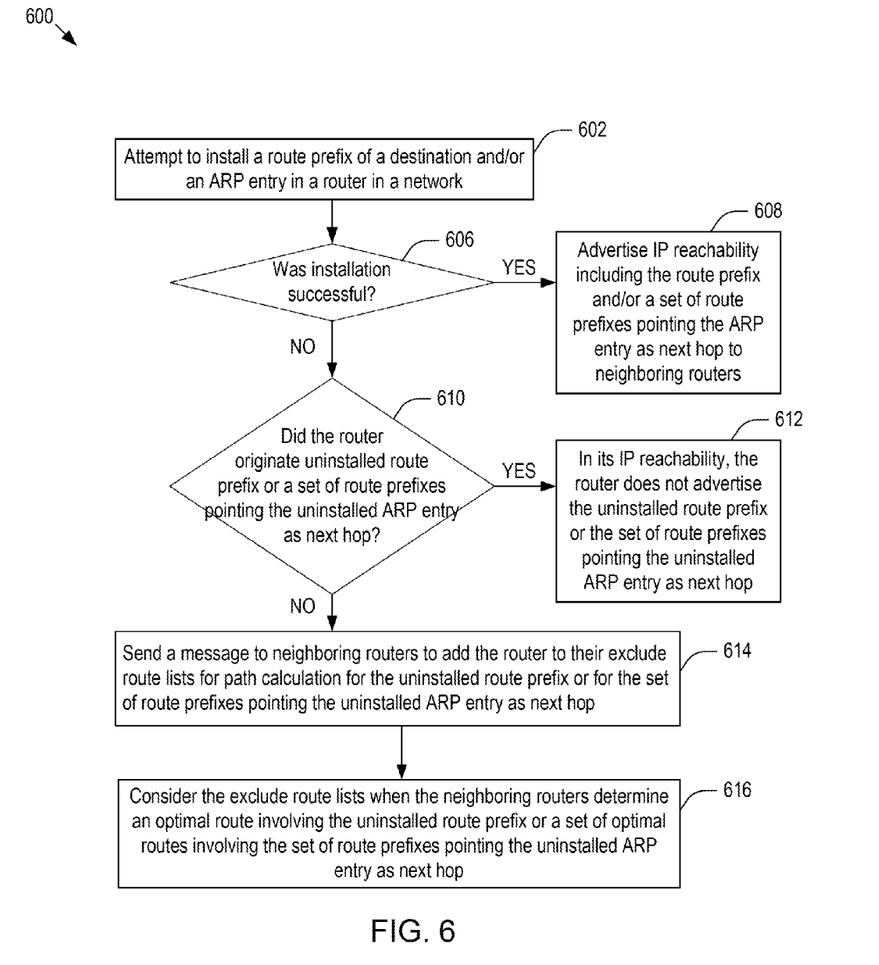
FIG. 6 shows a flowchart of an exemplary process for determining optimal routes for transmitting data in a network according to embodiments of the present invention.

FIG. 6 shows a flowchart 600 of an exemplary process for determining an optimal route for transmitting data in a network according to embodiments of the present invention. At step 602, a router receives a route prefix information (or, other suitable IP information) of a destination and attempts to install the route prefix or an address-resolution-protocol (ARP) entry in the router. Hereinafter, the term route-related network information collectively refers to a route prefix and an ARP entry. Then, at step 606, it is determined whether the installation of the route-related network information was successful, i.e., the route prefix was properly installed in the router or the ARP entry was properly installed in the router. If the answer to the decision 606 is affirmative, the router does not have any failure and thus, at step 608, the router can advertise IP reachability including the route prefix of the destination and/or a set of route prefixes pointing the ARP entry as next hop to neighboring routers.

If the answer to the decision 606 is negative due to a failure, such as hardware failure, CAM full, hash collision, etc., the process proceeds to step 610. At step 610, it is determined whether the router originated the uninstalled route prefix or a set of route prefixes pointing the uninstalled ARP entry as next hop. Hereinafter, the term "a set of route prefixes" refers to one or more route prefixes. If the answer to the decision 610 is affirmative, at step 612, the router does not advertise the uninstalled route prefix in its IP reachability in case of route prefix installation failure. Likewise, the router does not advertise a set of route prefixes pointing the uninstalled ARP entry as next hop in its IP reachability in case of ARP entry failure. If the answer to the decision 610 is negative, the process proceeds to step 614.

At step 614, the router sends a message to neighboring routers to add the router to their exclude route lists for the uninstalled route prefix so that the neighboring routers exclude the router for path calculation for the uninstalled route prefix in case of route prefix installation failure. In embodiments, the message includes the route prefix of the destination and an identification (ID), such as IP address, of the router, as discussed in conjunction with FIG. 3. In case of ARP entry failure, the router sends a message to neighboring routers to add the router to their exclude route lists so that the neighboring routers exclude the router for path calculation for a set of route prefixes pointing to the uninstalled ARP entry as next hop. In embodiments, the message includes the set of route prefixes pointing the uninstalled ARP entry as next hop and an identification (ID), such as IP address, of the router. Then, at step 616, in case of route prefix installation failure, the exclude route list is considered when each of the neighboring routers runs a SPF calculation to determine an optimal route involving the uninstalled route prefix. In case of ARP entry failure, the exclude route list is considered when each of the neighboring routers runs a SPF calculation to determine optimal routes involving a set of route prefixes pointing the uninstalled ARP entry as next hop. It is noted that, if the router is in the exclude route list, the neighboring routers would exclude the router when they determine the optimal route for a particular destination so that the data can be delivered to the destination without any traffic loss.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
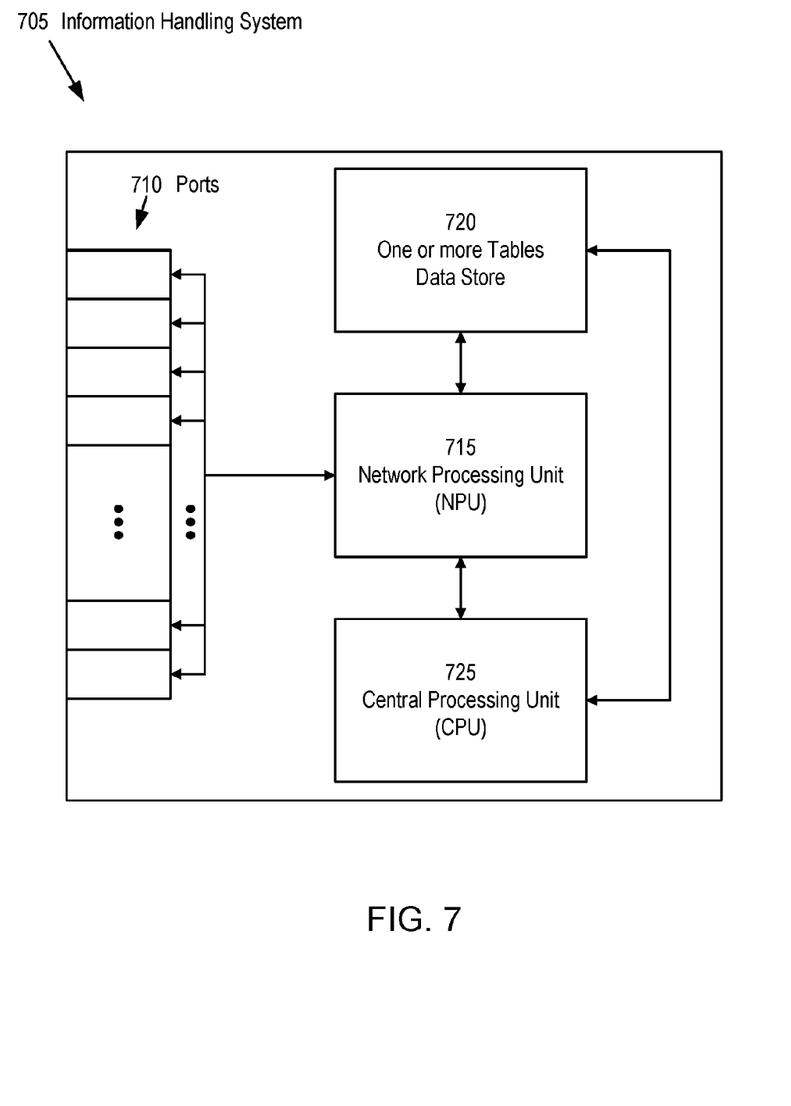
FIG. 7 shows a simplified block diagram of an information handling system according to embodiments of the present invention.

FIG. 7 depicts a simplified block diagram of an information handling system 705 according to embodiments of the present invention. It will be understood that the functionalities shown for device 705 may operate to support various embodiments of an information handling system (or node)—although it shall be understood that an information handling system may be differently configured and include different components. The information handling system 705 may include a plurality of I/O ports 710, a network processing unit (NPU) 715, one or more tables 720, and a central processing unit (CPU) 725. The system includes a power supply (not shown) and may also include other components, which are not shown for sake of simplicity.

In embodiments, the I/O ports 710 may be connected via one or more cables to one or more other network devices or clients. The network processing unit (NPU) 715 may use information included in the network data received at the node 705, as well as information stored in the tables 720, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for preventing traffic loss of data in a network, comprising:
   responsive to a fail condition to install a route prefix of a destination in a first routing device, determining whether the first routing device originates the route prefix;
   responsive to a determination that the first routing device originates the route prefix, not advertising the route prefix in an internet protocol (IP) reachability; and
   responsive to a fail condition to install an ARP entry, sending a first message containing a set of route prefixes pointing the ARP entry as a next hop to a second routing device to exclude the first routing device for path calculation for the set of route prefixes.

2. A method as recited in claim 1, further comprising:
   responsive to a determination that the first routing device does not originate the route prefix, sending a second message to a routing device to exclude the first routing device for path calculation for the route prefix.

3. A method as recited in claim 2, wherein the second message includes the route prefix and an identity of the first routing device.

4. A method as recited in claim 2, further comprising:
   considering the second message in determining an optimal route involving the route prefix.

5. A method as recited in claim 1, further comprising:
   storing the first message into the second routing device.

6. A method as recited in claim 1, further comprising:
   determining whether the first routing device originates the set of route prefixes pointing the ARP entry as a next hop; and
   responsive to a determination that the first routing device originates the set of route prefixes, not advertising the set of route prefixes pointing the ARP entry as a next hop.

7. A non-transitory computer-readable medium or media comprising one or more sequences of instructions which, when executed by one or more processors, causes the one or more processors to perform at least the steps of claim 1.

8. A method for preventing traffic loss of data in a network, the method comprising:
   responsive to a fail condition to install route-related network information in a first routing device, determining whether the first routing device originates a set of route prefixes associated with the route-related network information;
   responsive to a determination that the first routing device originates the set of route prefixes, not advertising the set of route prefixes in an internet protocol (IP) reachability; and
   responsive to a determination that the first routing device does not originate the set of route prefixes, sending a message to a second routing device to add the first routing device to an exclude route list of the second routing device for path calculation involving the set of route prefixes.

9. A method as recited in claim 8, wherein the fail condition is a failure to install a route prefix of a destination and the route-related network information includes a route prefix of the destination and the message includes the route prefix and an identity of the first routing device.

10. A method as recited in claim 9, further comprising:
    considering the exclude route list in determining an optimal route involving the route prefix.

11. A method as recited in claim 8, wherein the fail condition is a failure to install an address-resolution-protocol (ARP) entry and the route-related network information includes the ARP entry and the set of route prefixes point the ARP entry as a next hop.

12. A method as recited in claim 11, further comprising:
    considering the exclude route list in determining a set of optimal routes involving the set of route prefixes.

13. A method as recited in claim 11, wherein the message includes the set of route prefixes and an identity of the first routing device.

14. A non-transitory computer-readable medium or media comprising one or more sequences of instructions which, when executed by one or more processors, causes the one or more processors to perform at least the steps of claim 8.

15. An information handling system for preventing traffic loss of data in a network, the information handling system comprising:
    one or more processors; and
    a non-transitory computer-readable medium or media comprising one or more sequences of instructions which, when executed by the one or more processors, causes steps to be performed comprising:
    responsive to a fail condition to install route-related network information in a first routing device, determining whether the first routing device originates a set of route prefixes associated with the route-related network information;
    responsive to a determination that the first routing device originates the set of route prefixes, not advertising the set of route prefixes in an internet protocol (IP) reachability; and
    responsive to a determination that the first routing device does not originate the set of route prefixes, sending a message to a second routing device to add the first routing device to an exclude route list of the second routing device for path calculation involving the set of route prefixes.

16. An information handling system as recited in claim 15, wherein the fail condition is a failure to install a route prefix of a destination and the route-related network information includes a route prefix of the destination and the message includes the route prefix and an identity of the first routing device.

17. An information handling system as recited in claim 16, further comprising:
    considering the exclude route list in determining an optimal route involving the route prefix.

18. An information handling system as recited in claim 15, wherein the fail condition is a failure to install an address-resolution-protocol (ARP) entry and the route-related network information includes the ARP entry and the set of route prefixes point the ARP entry as a next hop.

19. An information handling system as recited in claim 18, further comprising:
    considering the exclude route list in determining a set of optimal routes involving the set of route prefixes.

20. An information handling system as recited in claim 18, wherein the message includes the set of route prefixes and an identity of the first routing device.

* * * * *